US008547333B2

(12) United States Patent
Pasquero et al.

(10) Patent No.: US 8,547,333 B2
(45) Date of Patent: Oct. 1, 2013

(54) OPTICAL NAVIGATION DEVICE WITH HAPTIC FEEDBACK

(75) Inventors: Jerome Pasquero, Kitchener (CA);
Steven Henry Fyke, Waterloo (CA);
Marc Edward Holbein, Kitchener (CA);
Thomas William Holbrook, Waterloo (CA)

(73) Assignee: BlackBerry Limited, Waterloo Ontario (CA)

( * ) Notice: Subject to any disclaimer, the term of this patent is extended or adjusted under 35 U.S.C. 154(b) by 145 days.

(21) Appl. No.: 13/166,110

(22) Filed: Jun. 22, 2011

(65) Prior Publication Data

US 2012/0326982 A1 Dec. 27, 2012

(51) Int. Cl.
*G06F 3/033* (2013.01)

(52) U.S. Cl.
USPC ............................ 345/161; 345/157; 345/163

(58) Field of Classification Search
USPC ................. 345/150, 157, 160, 161, 163, 167, 345/173, 156; 178/18.04, 18.09; 463/37, 463/38
See application file for complete search history.

(56) References Cited

U.S. PATENT DOCUMENTS

| 6,545,662 | B1* | 4/2003 | Noll et al. ...................... 345/158 |
| 6,563,487 | B2 | 5/2003 | Martin et al. |
| 6,995,744 | B1* | 2/2006 | Moore et al. .................. 345/156 |
| 7,310,081 | B2 | 12/2007 | Nakamura et al. |
| 7,336,266 | B2 | 2/2008 | Hayward et al. |
| 7,408,718 | B2* | 8/2008 | Smith ........................... 359/673 |
| 7,450,110 | B2 | 11/2008 | Shahoian et al. |
| 7,474,296 | B2* | 1/2009 | Obermeyer et al. .......... 345/156 |
| 7,528,824 | B2* | 5/2009 | Kong .............................. 345/168 |
| 7,626,572 | B2* | 12/2009 | Baudisch et al. ............. 345/163 |
| 7,701,440 | B2* | 4/2010 | Harley .......................... 345/157 |
| 7,889,176 | B2* | 2/2011 | Harley et al. ................. 345/157 |
| 8,077,147 | B2* | 12/2011 | Krah et al. .................... 345/163 |
| 8,210,942 | B2* | 7/2012 | Shimabukuro et al. ......... 463/30 |
| 2002/0033795 | A1 | 3/2002 | Shahoian et al. |
| 2002/0084982 | A1* | 7/2002 | Rosenberg .................... 345/157 |
| 2003/0132914 | A1* | 7/2003 | Lee ............................... 345/163 |
| 2004/0183782 | A1* | 9/2004 | Shahoian et al. ............. 345/163 |
| 2004/0237669 | A1* | 12/2004 | Hayward et al. ......... 73/862.624 |
| 2005/0110755 | A1* | 5/2005 | Harley et al. ................. 345/160 |
| 2006/0038776 | A1 | 2/2006 | Ahn et al. |
| 2006/0098899 | A1* | 5/2006 | King et al. .................... 382/305 |

(Continued)

FOREIGN PATENT DOCUMENTS

EP 1939712 A1 7/2008

OTHER PUBLICATIONS

Extended European Search Report for EP Application No. 11710113.3 dated Nov. 18, 2011.

(Continued)

*Primary Examiner* — Joe H Cheng
(74) *Attorney, Agent, or Firm* — Tim Clise; Jon A. Gibbons; Fleit Gibbons Gutman Bongini & Bianco PL (57) ABSTRACT

An optical joystick is connected to a vibratory transducer such as a piezoelectric transducer, where the vibratory transducer produces vibration which may be perceived upon a surface of the optical joystick. The vibration is perceived primarily at the surface of the optical joystick, and not upon a case of the computing device, and is distinguishable from other vibrations which may be induced in the computing device. Vibrations are created to indicate scrolled items in a list, selected items, or navigation within certain displayed zones.

20 Claims, 6 Drawing Sheets

(56) References Cited

U.S. PATENT DOCUMENTS

| | | | |
|---|---|---|---|
| 2006/0192760 A1* | 8/2006 | Moore et al. | 345/163 |
| 2006/0208170 A1* | 9/2006 | Xie | 250/221 |
| 2006/0284831 A1* | 12/2006 | Rosenberg | 345/156 |
| 2007/0002020 A1* | 1/2007 | Ranta et al. | 345/166 |
| 2007/0126700 A1 | 6/2007 | Wright | |
| 2007/0236450 A1 | 10/2007 | Colgate et al. | |
| 2008/0062143 A1* | 3/2008 | Shahoian et al. | 345/173 |
| 2008/0068348 A1 | 3/2008 | Rosenberg et al. | |
| 2008/0111788 A1 | 5/2008 | Rosenberg et al. | |
| 2008/0134784 A1* | 6/2008 | Jeng et al. | 73/514.01 |
| 2008/0199332 A1 | 8/2008 | Satoh et al. | |
| 2008/0309621 A1* | 12/2008 | Aggarwal et al. | 345/173 |
| 2009/0184852 A1 | 7/2009 | Ahn et al. | |
| 2009/0195503 A1* | 8/2009 | Lee et al. | 345/166 |
| 2009/0225028 A1* | 9/2009 | Abrams et al. | 345/161 |
| 2009/0225030 A1* | 9/2009 | Vaananen et al. | 345/163 |
| 2010/0027854 A1 | 2/2010 | Chatterjee et al. | |
| 2010/0060578 A1 | 3/2010 | Chen et al. | |
| 2010/0097198 A1 | 4/2010 | Suzuki | |
| 2010/0171715 A1* | 7/2010 | Peterson et al. | 345/173 |
| 2010/0302159 A1 | 12/2010 | Findlay et al. | |
| 2011/0037706 A1* | 2/2011 | Pasquero et al. | 345/173 |
| 2011/0141048 A1* | 6/2011 | Brosnan et al. | 345/173 |
| 2011/0298711 A1* | 12/2011 | Dean et al. | 345/161 |

OTHER PUBLICATIONS

European Communication pursuant to Article 94(3) EPC dated Jan. 4, 2013 for EP application No. 11171013.3.

* cited by examiner

OPTICAL NAVIGATION DEVICE WITH HAPTIC FEEDBACK

FIELD OF THE DISCLOSURE

The present disclosure generally relates to haptic feedback, and more particularly to vibration localized to a portion of an electronic apparatus.

BACKGROUND

Tactile or haptic feedback devices for electronic apparatus include motion producing transducers, which typically produce vibration which may be sensed by a human user. Examples include vibrating steering wheels in game consoles to simulate a crash, and vibration within mobile communications devices to indicate a received communication. Vibrations may be generated, for example, by a motor coupled to an imbalanced weight. The motor is coupled to a case of the device, thereby imparting a vibratory energy to the device, generally.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Optical navigation sensors, such as an optical joystick (OJ) or an optical navigation mouse (ONM), offer certain advantages over other navigation devices, such as a mouse or trackball, which include an exposed spherical object. For example, optical navigation sensors are less prone to failure or difficulties attributable to debris entering the device, and do not have a requirement of sufficient traction to move the spherical object.

Figure 1:
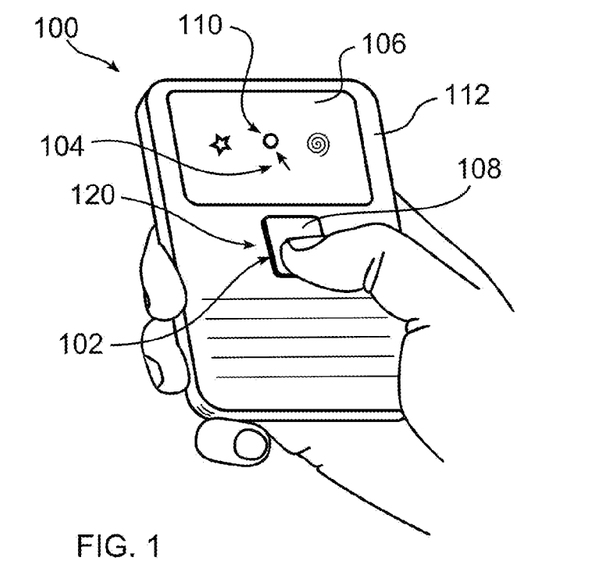
FIG. 1 is a perspective view of an apparatus including a vibrating navigation device in accordance with one example.

Turning now to FIG. 1 shown is a handheld unit 100 including an optical navigation device 120. An indicator 104 is shown on a display 106. The indicator 104 moves across the display 106 in response to a user's finger moving across surface 108 of the optical module 102 and to further accept a selection of an indicated object 110 visible on a display. When surface 108 is pressed by the user's finger a selection is made. In another example, optical navigation device 120 provides tactile feedback when surface 108 is pressed. In a further embodiment, a vibration is induced in optical navigation device 120, the vibratory effect being substantially localized or perceptively attributable, by a user, to optical navigation device 120, with respect to a remainder of handheld unit 100, for example case 112.

Optical navigation device 120 includes a touchable surface 108, operable to be pressed to indicate a specific gesture of a user to an handheld unit 100. In the illustrations, a user's finger, thumb, or digit is shown, however for optical navigation touch surfaces, in particular, any object operative to change reflected light within the optical navigation device may advantageously be used to indicate a gesture.

Vibration, including haptic feedback, is able to be used to indicate initiation of a complex or compound gesture. Examples include a combination of a press gesture with a sliding gesture; a double press or double-click; the start, execution, and or completion of a multi-finger gesture; or any other known or hereinafter invented gesture may be employed with a touchable surface 108. Each distinct gesture may be identified by providing a unique pattern and or frequency of vibration.

In one example, a brief vibration of less than 1 second, for example 0.1 seconds, is triggered for each item in a list of items visible upon display 106, as a user scrolls the list of items using device 120. In this manner a user perceives each item scrolled, and understands more easily and intuitively, with respect to perceived vibration, a rate at which scrolling is occurring, and the number of items scrolled.

In FIG. 1, a mobile, or handheld device 100 is shown. It should be understood, however, that an optical navigation device 120 may be used in conjunction with any computing device, either integrated into a housing of the device, or physically separated or separable. Optical navigation device 120 may communicate with handheld unit 100 by any known means, including use of a wire, or through a signal transmitted by wave, or pulsed energy.

Optical module 102 may have a resting, un-pressed, or starting position which is higher than a housing 112 surface, and when pressed, may have a pressed or finishing position which remains higher than housing 112 surface. Moreover, a peripheral frame, or bezel (not shown) may surround surface 108, and surface 108 may have a starting position which is higher than the bezel, and a finishing position which remains higher than the bezel. As such, the bezel or surface 108 will not interfere with a sliding movement of a digit of a user.

The term vibration, as used herein, refers to an oscillation perceptible by a human user. The vibration may be perceived as an auditory sound, for example a click, or a movement sensed by tactile perception, such as a buzz, and may be simultaneously perceived by more than one sense, for example auditory and tactile. The oscillation further need not be fixed or periodic, and may produce varied and changing tactile and or auditory content over time.

Figure 2:
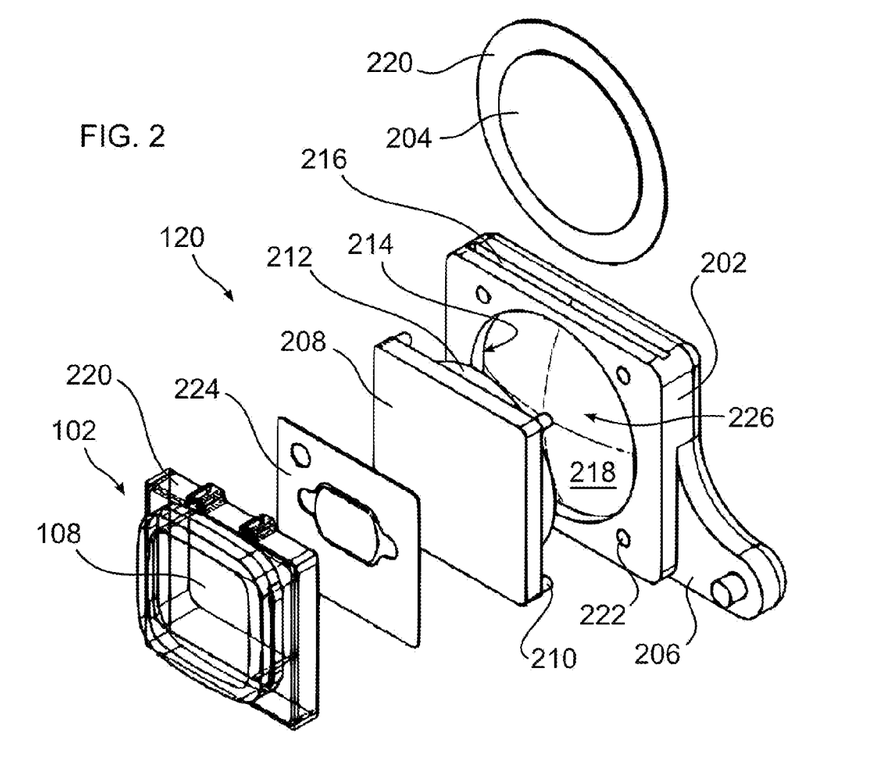
FIG. 2 is an exploded perspective view of components of the navigation device of FIG. 1.
Figure 3:
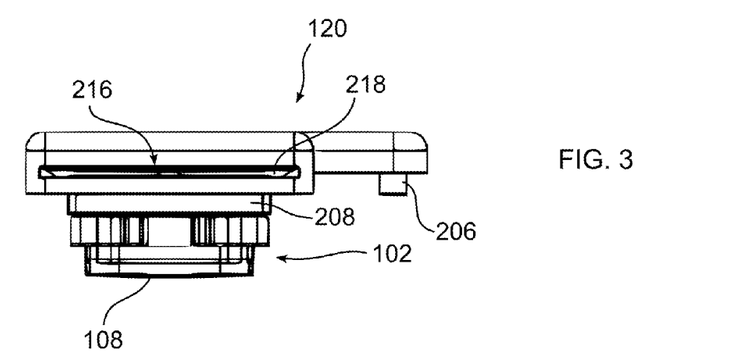
FIG. 3 is a side view of a vibrating navigation device in accordance with one example.
Figure 4:
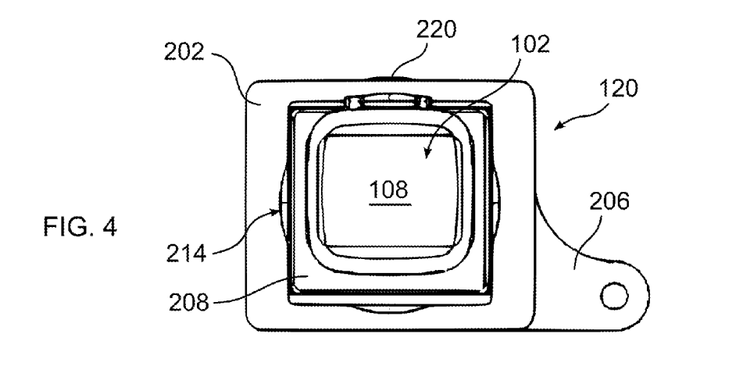
FIG. 4 is a top view of the device of FIG. 3.

With reference to FIGS. 2 to 4, a housing 202 is sized and dimensioned to retain one or more vibratory transducers 204, for example a sound transducer, piezo transducer, or other vibration producing element capable of responding to an electrical signal to produce a vibration. Housing 202 advantageously provides a rigid and protective housing, but does not restrict a desired vibratory movement of transducer 204. More particularly, transducer 204 is not pinned or secured from a desired vertical and horizontal movement, so that transducer 204 is free to vibrate a desired amount. A piezoelectric transducer is suitable as it is operable to produce adequate vibration from a very thin device.

A flexible shim 220 is coupled to transducer 204 to provide strength and durability, resiliency, amplification of vibration, and spacing of transducer 204 from contact, and particularly direct vibratory contact with other objects, which may tend to produce wear of transducer 204. Coupling of transducer 204 and shim 220 is by any means known in the art, and may include mechanical means, including adhesive, threaded fasteners, or other bonding means.

Housing 202 includes one or more mounting locators 206 operative to orient or position housing 202 with respect to a case 112 of handheld unit 100, and other components of handheld unit 100, and to maintain a position of housing 202, particularly with respect to a cumulative vibration of transducer 204 within housing 202. Mounting locator 206 may include an electrical connector, not shown, operative to communicate an electrical signal to transducer 204, to thereby induce vibration in transducer 204. Electrical leads associated with transducer 204 are not illustrated, but are well understood by those skilled in the art. Mounting locator 206 may be omitted and other means of locating and mounting housing 202 may be used, for example, adhesives or mechanical means including threaded fastener, pins, clips, or clamps.

With further reference to FIGS. 2 to 4, coupling base 208 is positioned with respect to housing 202 to thereby contact transducer 204 during at least a portion of a stroke of vibratory action of transducer 204. One or more locators 210 are positioned to engage mating locators 222, and may have the form, for example of pins and apertures. Locators 210 are formed as pins, whereby when transducer 204 is inserted within housing 202, locators 210 may be inserted within apertures of locators 222, thereby preventing migration of transducer 204 from a desired position within housing 202. Base 208 is operative to support additional structures, such as a tactile feedback dome 224 of device 120, and to propagate vibratory energy generated by transducer 204 to such structures, for example, as surface 108 and associated optical subcomponents (not illustrated). A base projection or extension 212 is provided, operative to provide a projecting surface into aperture 214 and reduce a distance between inserted transducer 204 and base 208, to thereby improve a transmission of vibratory energy into base 208.

Transducer 204 may be retained within housing 202, in one example, by being admitted or inserted within slot 216 communicative with a chamber 226 sized larger than transducer 204. Once disposed within housing 202, vibratory energy generated by transducer 204 may be propagated to base 208 through aperture 214.

A surface 218 of housing 202 is provided with an extending surface, such as a curved shape, operative to bias transducer 204 in a direction of base 208, when transducer 204 is positioned within housing 202. Surface 218 is additionally operative thereby to assist in retaining transducer 204 within housing 202.

In another example, surface 218 may be formed of a resilient material, thereby operative to function as a tactile feedback dome, or non-vibrating damping element. The resilient material deflects to provide bounce, or progressive movement, of surface 108 when pressed or moved through an extent of an operating stroke.

It should be understood that the audible and or tactile vibration produced by device 120 may be in addition to any other vibration or perceptible feedback which is provided by handheld unit 100, including an audible, visible, or tactile feedback, for example the click of a tactile dome.

With further reference to FIGS. 2 to 4, optical navigation device 120 includes a navigation sensor, for example an optical module 102, positionable proximate to and in vibration transmitting contact with transducer 204. Optical module 102 includes a surface 108 operative to transmit a change in a reflection of light from an object, for example a fingertip, which is moved across surface 108. A case 220 is operative to support surface 108, and to retain other components of optical module 102, which are not shown, but which are understood by those skilled in the art. Such other components may, for example, include at least one light source, and at least one light sensor operative to sense a change in reflected or transmitted light upon a plane of surface 108.

Transducer 204 is positioned sufficiently proximate to optical module 102 so that vibrations generated by transducer 204 are transmitted to surface 108 to a substantially greater extent than to housing 112, or any other component of handheld unit 100. More particularly, it is easier for a user to distinguish that a vibration produced is attributable to or associated with module 102, and not another component of handheld unit 100, and not a general vibration of handheld unit 100. In this manner, other components of handheld unit 100 may generate vibrations which are distinguishable from vibrations of transducer 204, and consequently a greater amount of information may be communicated to a user through the use of vibration.

In FIGS. 2 to 4, optical module 102 is positioned upon base 208. As may be seen in FIG. 5, a resilient tactile feedback dome 224 is interposed between base 208 and optical module 102, operative to provide the aforedescribed progressive movement of surface 108, either alone, or together with surface 218, particularly if the latter is resilient. Optical module 102 may be attached to base 208 by any known means which is operative to enable a transmission of vibration from transducer 204, including but not limited to adhesive, threaded fasteners, clips, or pins. Alternatively, optical module 102 may be secured in relation to transducer 204 by a case or housing 112 of handheld unit 100. In one embodiment, base 208 is not provided, and optical module 102 is positioned in direct contact with housing 202. Alternatively, locators 210 or other connecting or alignment means may be formed upon module case 220.

Figure 5:
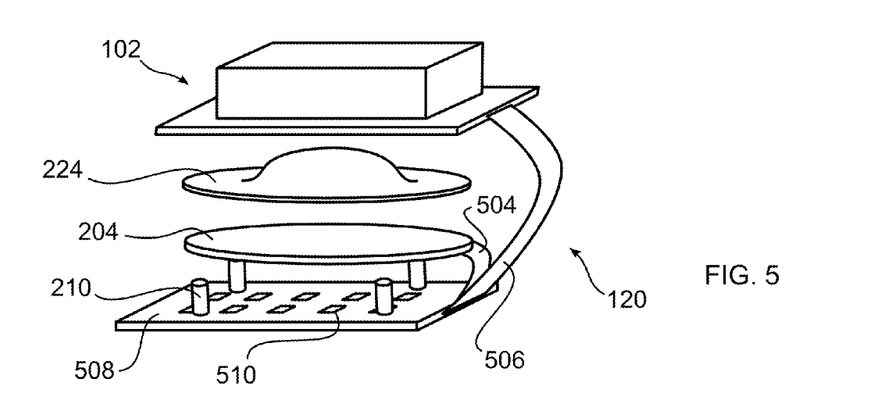
FIG. 5 is an exploded perspective view of a vibrating navigation device including a tactile dome, in accordance with one example.

In another example, tactile feedback dome 224 is omitted, wherein either surface 218 alone provides tactile non-vibratory feedback upon a press of surface 108, or another element, disposed within or associated with optical module 102, provides such tactile feedback.

With further reference to FIG. 5, an example of optical navigation device 120 includes a tactile dome 224 interposed between transducer 204 and optical module 102. Conductors 504, 506 form an electrical connection between transducer 204 and optical module 102, respectively. Locators 210, shown as cylinders, retain a position of transducer 204, and advantageously maintain a position of other components, for example dome 224 and module 102, with respect to transducer 204. Locators 210 are shown as cylinders positioned about a periphery of transducer 204, but may have any shape which guides or maintains transducer 204 in an operational location, including side walls, berms, bevels, or other structure.

Referring now to FIGS. 6 to 9, according to one example, a pressure sensitive pad 602 is positioned under module 102, operative thereby to convert and electrically communicate information pertaining to a sensed pressure applied to module 102 through an electrical signal conducted to other components of handheld unit 100, by conductor 604. Conductors 504, 506, 604 may be of any known type, including ribbons, wire, contactors, or other means of forming an electrical connection. Pad 602 may be formed of a flexible, resilient, and or compressible material, in order to provide tactile feedback by bending or deforming, for example as illustrated by arrow "A" in FIG. 8, to permit movement of associated optical module 102. The flexible compressible material may be, for example, a urethane foam, including PORON™ (a registered trademark of World Properties, Inc., of Lincolnwood, Ill.), although any material suitable for the intended environment, and which is compressible or bendable, may be used. One or more pressure transducers 606 are associated with the compressible material of pad 602, positioned above, below, or within the material of pad 602, whereby an extent of pressure applied to optical module 102 may be sensed, and a corresponding electrical signal transmitted through conductor 604. In one example, a binary result indicates whether a threshold pressure has been applied to optical module 102. In another example, pressure transducers 606 create discrete pressure zones or areas within pad 602, each operative to signal an applied pressure separately and distinctly from a pressure applied to other areas within pad 602, whereby directional information may be conveyed by pressing optical module 102 in locations corresponding to the discrete pressure zones. In a further embodiment, pressure sensors 606 are operative to convey a range of pressure values dependent upon an extent of pressure applied to module 102, and in examples with discrete pressure zones, convey a range of pressure values dependent upon an extent of pressure applied and a proximity of the application of pressure to a location of a discrete pressure zone.

Figure 6:
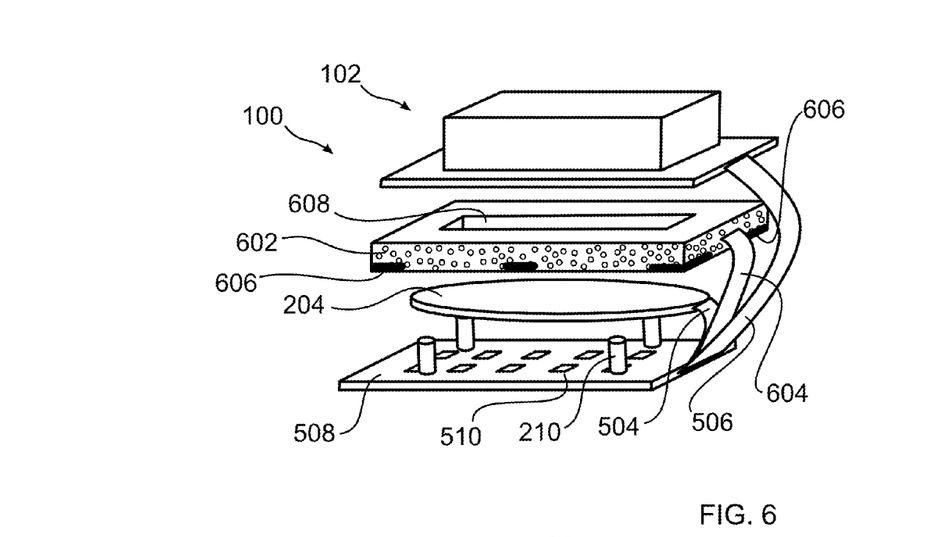
FIG. 6 is an exploded perspective view of a vibrating navigation device including a pressure transducer pad, in accordance with one example.
Figure 7:
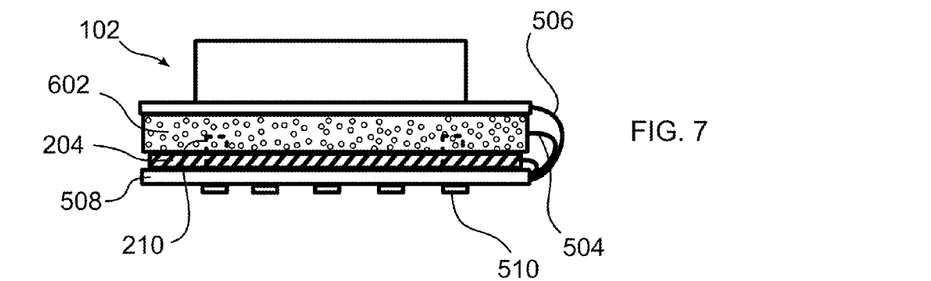
FIG. 7 is a side view of the device of FIG. 6.
Figure 8:
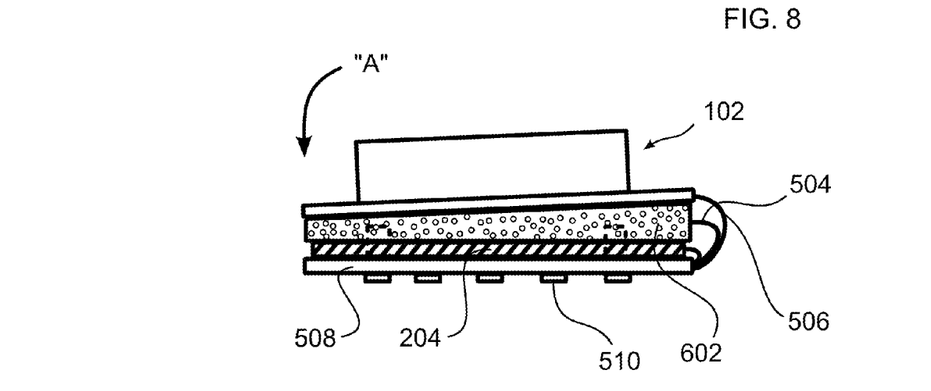
FIG. 8 is a side view of the device of FIG. 7, indicating a pressure applied to a portion of the device.

In FIG. 7, transducer 204 is disposed below pad 602, but may be located above, below, or within pad 602. A pad aperture 608 may be provided, operative to reduce a pressure required to bend, compress, or deflect pad 602, and further operative to change a shape and dimension of pad 602 to better admit and or conduct passage of vibratory energy generated by transducer 204. As may be seen in FIG. 9, pad 602 may be combined with tactile dome 224, or may alone provide a desired tactile feedback, as illustrated in FIGS. 6-8.

Figure 9:
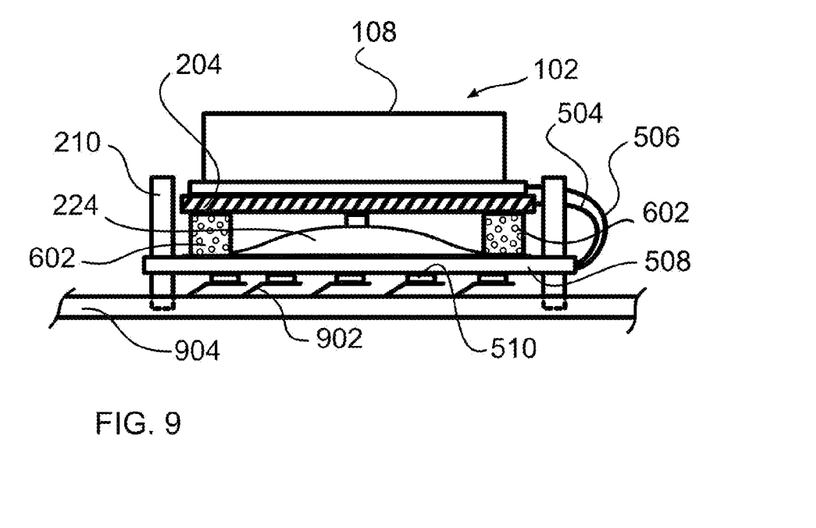
FIG. 9 is a side view of a vibrating navigation device including a tactile dome, and a plurality of pressure sensitive pads, in accordance with one example.

FIG. 9 illustrates a combination of tactile dome 224 and pad 602. Further illustrated is a plurality of pads 602, each operative to indicate a sensed pressure upon module 102 and surface 108. Locators 210 are illustrated to surround a periphery of pads 602, transducer 204, and a portion of optical module 102, enabling a desired limit to movement of transducer 204 vertically and horizontally, whereby transducer 204 is captured, but is free to vibrate as intended. In an example, conductors 510 are positioned on an engaging face of intermediate board 508, operative to engage mating conductors 902 on a main circuit board 904 of handheld unit 100. It should be understood, however, that intermediate board 508 may not be provided, and electrical connections of device 120 may be transmitted directly to main circuit board 904. Mating board contactors 902 are illustrated to resiliently engage connectors 510. In an alternative example, contactors 902 may be static, or fixed, and connectors 510 are resilient, or both contactors 902 and connectors 510 may be either resilient or static.

In accordance with the foregoing, an example enables programmable tactile feedback which is generated locally to surface 108, such as an optical joystick, optical navigation mouse, or output display. By isolating vibratory tactile feedback to surface 108, and consequently to be perceived by a finger, thumb, or other body part or implement that is interacting with surface 108, other portions of the body, such as the hand or palm, perceive the vibration in a greatly attenuated or insubstantial manner, whereby a vibration generated at surface 108 may be distinguished from ambient vibrations, and a vibration of handheld unit 100, generally. This localized vibration facilitates a differentiation between a vibration to a body of handheld unit 100, indicative for example of an incoming message, from a vibration at surface 108, indicative for example of acknowledgement of a selection.

Software associated with handheld unit 100, may determine a location of an indicator displayed on a visible output device, a state of pressure upon surface 108, or both. Software can also, depending upon a function currently activated, or an object currently indicated or selected, generate a signal to cause transmission by transducer 204 of a unique vibratory pattern, frequency, or combination of vibratory patterns and frequencies, uniquely associated with use of optical navigation device 120. Transducer 204 is able to produce a plurality of frequencies, either separately or in combination, and to transmit vibration at these frequencies each for a desired time period, thereby increasing a number of possible distinct vibrations. In one example, this desired or predetermined time period is settable by a user. In this manner, confirmation of an action, or indication of a location indicated upon a display of handheld unit 100, may be communicated without a requirement of viewing the display, or with a reduced requirement for concentration upon a display. This non-visual indication facilitates use of handheld unit 100, and may improve safety while using handheld unit 100, particularly where an ability to view a display is brief, limited, or impossible.

As alternatives to pad 602, a press of touch surface 108 may be indicated or signaled to other portions of handheld unit 100 as a "press signal", in any known manner, including, for example, the use of a strain gauge; movement of a mechanical switch; movement of a resilient member, such as a tactile feedback dome 224, spring, or flexible member, associated with a switch or contacts; or an optically activated sensor or switch, which is operable to detect a pressure upon surface 108. A press signal is indicated, in one example, by a predetermined amount of pressure, or a predetermined increase in pressure, applied to surface 108, as compared to a resting or non-pressed state of surface 108.

In one example, an optical navigation device 120, such as that shown in FIGS. 2-4, includes a transducer 204 which may be a 10 mm diameter piezoelectric disc that is mounted beneath an optical module 102. The exact size of the transducer 204 can vary according to the application, for example from a few millimeters, to hundreds of millimeters. For most handheld applications, a transducer sized between about 5 mm to about 150 millimeters is generally suitable. The shape of transducer 204 may be round, square, or of any other shape. Vibration from transducer 204 is able to be isolated from portions of handheld unit 100 not including the surface 108 to be manipulated. For example, optical navigation device 120 may be isolated from handheld unit 100 by resilient mounting points, not shown. Slot 216 is sized to admit transducer 204, or slot 216 may be omitted, and transducer 204 may be installed within outer housing 202 during assembly of housing 202. A suitably sized interior space or cavity is provided within housing 202, to capture yet enable a desired vibratory movement of transducer 204, both vertically and horizontally. For example, a transducer 204 of 0.22 mm thickness may be captured within a cavity of 0.50 mm depth; however, transducer 204 may be of any thickness, for example, in most handheld applications, between about 0.1 mm to about 10 mm in thickness, and a cavity within housing 202 is correspondingly sized, to greater or lesser relative proportions than the example given of 0.22 mm transducer thickness and 0.50 mm depth.

Figure 10:
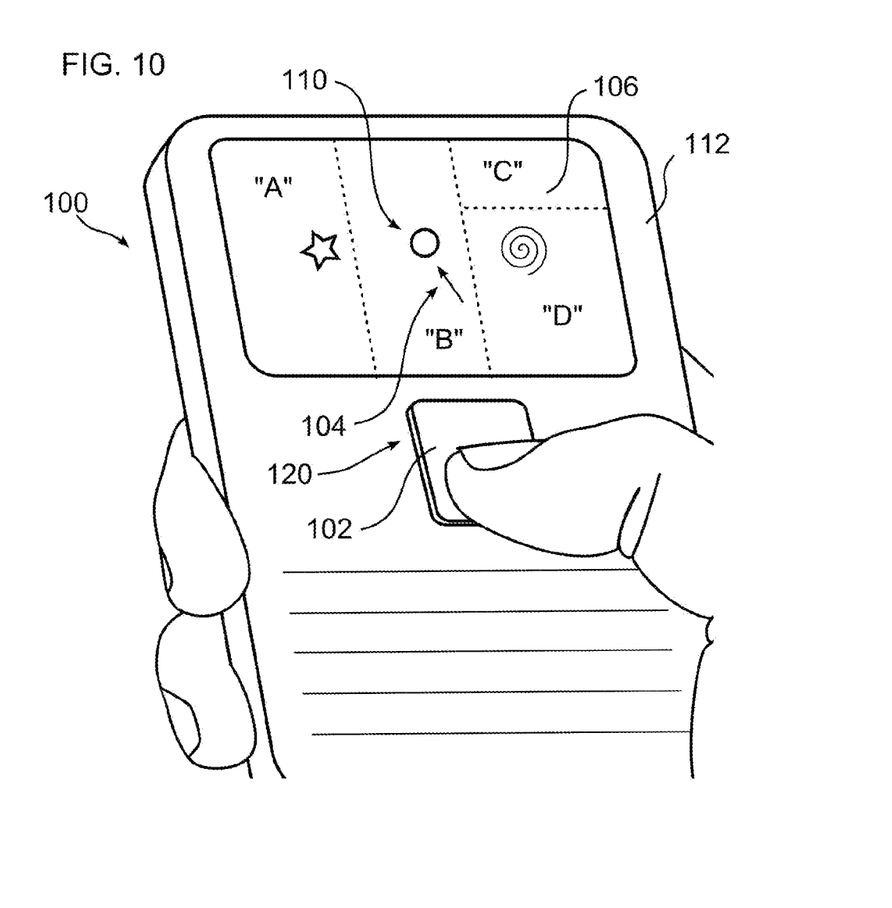
FIG. 10 illustrates vibration display regions of an apparatus including a vibrating navigation device, in accordance with one example.

With reference to FIG. 10, a handheld unit 100 includes an optical navigation device 120 and a display 106, the display notionally divided into, in this example, four zones or regions labeled "A" through "D". In one example, the mapping, or dimensions and vibration characteristics (duration, amplitude, frequency) of regions, are settable by the user. In the illustration, the regions are separated by dashed lines, for ease of understanding; however, in practice, there may be no visible demarcation, or there may be visible demarcations defining one or more regions. As a user causes an object to move across surface 108, a current relative display position is indicated by a cursor 104, or by any other visible indicator, for example a highlighting of visible objects. Alternatively, there may be no visible cursor or highlighting. In either case, software tracks movement across surface 108, and determines when movement corresponds to entry into a region, movement within a region, or exit from, any region. Optical navigation device 120 may produce a unique vibration, corresponding to any of such entry into a region, movement within a region, or exit from a region. A unique vibration in response to a change of position, for example movement from region "A" to region "B", may be formed by modulating a signal to transducer 204, changing any or all of an amplitude, phase, frequency, or duration of the signal, whereby transducer 204 emits unique vibrations corresponding to each region. The vibrations may be perceived to varying extents by different senses of the user, for example a perception that is primarily tactile, or primarily audible, or any combination of the two. In addition to causing vibration as a result of a change in position, vibrations may also, or alternatively, be caused as a result of events, as described with respect to FIG. 13, below.

Figure 11:
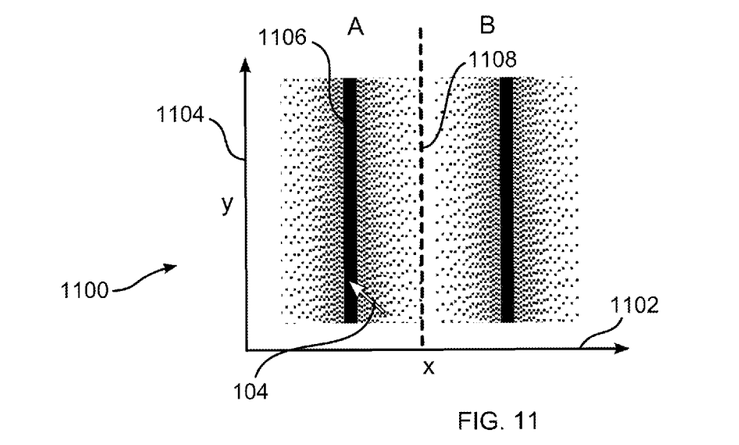
FIG. 11 illustrates regions of varying vibratory amplitude in accordance with one example.

Referring now to FIG. 11, as described with respect to FIG. 10, a display 106 is notionally divided into regions labeled "A" and "B". For simplicity the other two regions "C" and "D" in FIG. 10 are not shown in this example. Bands 1106 and 1108 are not visible, and represent an encoding of a particular amplitude, phase, and frequency, or any combination thereof, of vibration to be emitted as cursor 104 moves across display 106. For example, dark bands 1106 may correspond with transducer 204 emitting a vibration at a particular frequency, amplitude and phase, while lighter bands 1108 may correspond with either no vibration produced, or a vibration at a differing frequency, amplitude, phase, and or duration of vibration. In a specific example, an amplitude of vibration (A)=f(x,y)=a value associated with a pixel or area under cursor 104. In this manner, a user may perceive the traversal of individual list items with senses other than the visual sense, for example with a tactile and or auditory sense. The gradient aspect of the illustration indicates that the vibration emitted may be varied progressively, rather than as a discrete or abrupt change, as cursor 104 is moved, although an abrupt change is within the spirit and scope of the disclosure.

In FIG. 11, the regions are regularly defined, and reflect, for example, a list of items visible upon a display. In graph 1100, the x axis, or abscissa 1102, defines a first direction upon visible display 106, and the y axis, or ordinate 1104 defines a second direction upon visible display 106. In the example illustrated, as cursor 104 is moved along the y axis using device 120, cursor 104 remains within dark band 1106, and as cursor 104 is moved along the x axis, cursor 104 moves from dark band 1106 to light band 1108. The darkness of band 1106, 1108 is presented in FIG. 11 as a visible metaphor for data in a data table maintained in memory or storage and accessible by processor 1302. The data table contains a correlation of locations upon display 106, or locations within a displayed list of elements, and particular data values to be associated with those locations, notionally depicted as alternating bands of light and dark in FIG. 11.

Where bands 1106, 1108 are associated with a visible list of items, such as a table of items, either band 1106 or 1108 correlates to a visible item in a list displayed at least in part upon display 106, and the other of band 1106 or 1108 correlates to a blank region between visible list items.

While a single table may be used to encode for a particular frequency, amplitude, phase, duration, or any combination thereof, multiple tables may be used for a given location, each table encoding any one or more of these elements. Alternatively, a formula, for example amplitude A=sin($\pi$*x)+1, with the +1 to force all positive values of A. This example formula for amplitude, may be used to calculate particular values for each pixel location, group of pixels, or display region, either alone, or in combination with a table. In this example, more than one vibration may be emitted, to produce complex sounds or tones, or tactile output, including for example a musical tone, or speech. An example table of values using the formula above, with the values along Y axis, specified as amplitude, defined as follows:

| X | AMPLITUDE (A) = SIN($\Pi$ * X) + 1 |
|---|---|
| 0 | 1.0 |
| 0.2 | 1.6 |
| 0.4 | 1.9 |
| 0.6 | 1.9 |
| 0.8 | 1.6 |
| 1.0 | 1.0 |
| 1.2 | 0.4 |
| 1.4 | 0.0 |
| 1.6 | 0.1 |
| 1.8 | 0.4 |
| 2.0 | 1.0 |

Figure 12:
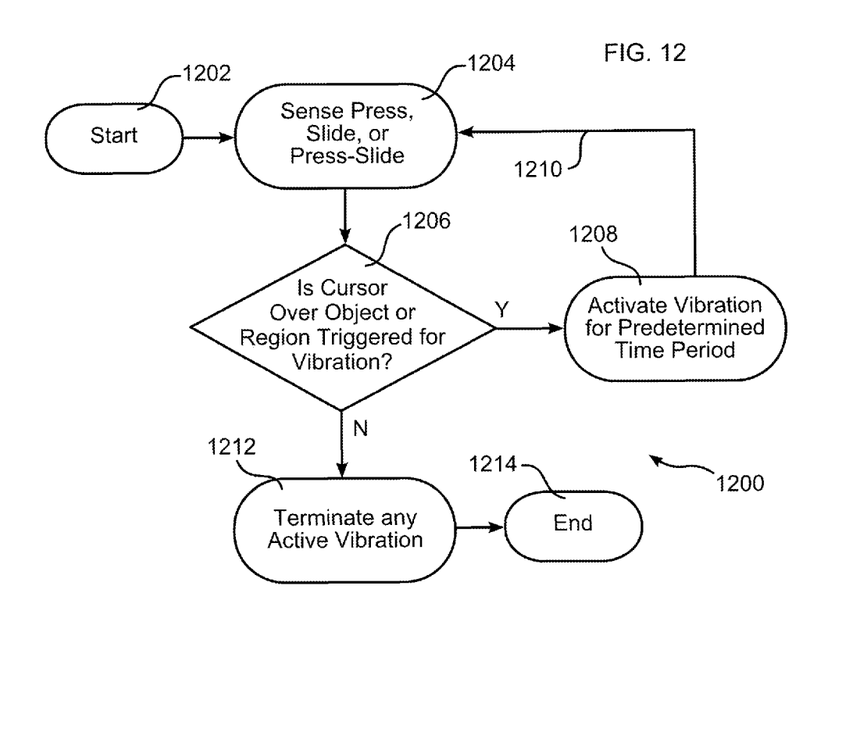
FIG. 12 is a flow chart for a process of operating an apparatus including a vibrating navigation device, in accordance with one example.

With reference to FIG. 12, an example process 1200 for indicating a sensed gesture and activating vibration using optical navigation device 120 is illustrated. The process begins in step 1202 and immediately proceeds to step 1204, where a processor senses an input to optical navigation device 120, which may be initiated by sliding, pressing, or pressing and sliding together (press-slide), any portion of surface 108 of the optical navigation device 120. The processor determines in step 1204 that a press, slide, or press-slide has occurred, and compares an indicator, for example a highlight, or a cursor 104 location with a visibly displayed object, for example object 110. The processor determines, in step 1206, that the object is triggered, active, or enabled for vibration if cursor 104 hovers, is pressed, or is press-slid over or near the object 110. If so, in step 1208 the optical navigation device 120 vibrates surface 108. Vibration may be programmed, using software, to be continuous during hovering, pressing, or press-sliding over the object 110, or may alternatively be enabled for a fixed period of time, for example a brief period of time sufficient for user to sense the vibration. If movement of cursor 104 continues and cursor 104 moves away from a position over or near the object 110, vibration may be terminated in step 1212. Similarly, if a press or press-slide activated vibration, releasing of the press may terminate vibration in step 1212 and the process ends in step 1214. In a similar manner, other forms of gestures, for example a double press, which may be combined with a press and slide, may be sensed and interpreted to carry out an intended task. Arrow 1210 indicates that vibration may be restarted, or may appear to be continuous, if a sensed slide, press, or press-slide is continued. Typically, a user would not sense a gap in time between commencing a vibration producing gesture, and activation of vibration in step 1208.

By combining, or integrating at least two of a transducer 204, tactile feedback dome 224, pad 602, and module 102, an optical navigation device 120 achieves a smaller footprint, a potentially reduced cost, simplified assembly and installation in handheld unit 100, simplified repair and replacement, and a reduction in power consumption through elimination of redundant circuitry. In addition, transducer 204, when provided in the form of a piezoelectric transducer, is advantageously able to generate a large set of perceptually distinguishable tactile or auditory stimuli, with a vibratory effect that is more easily isolated or localized to surface 108 relative to, for example, a vibration motor.

Figure 13:
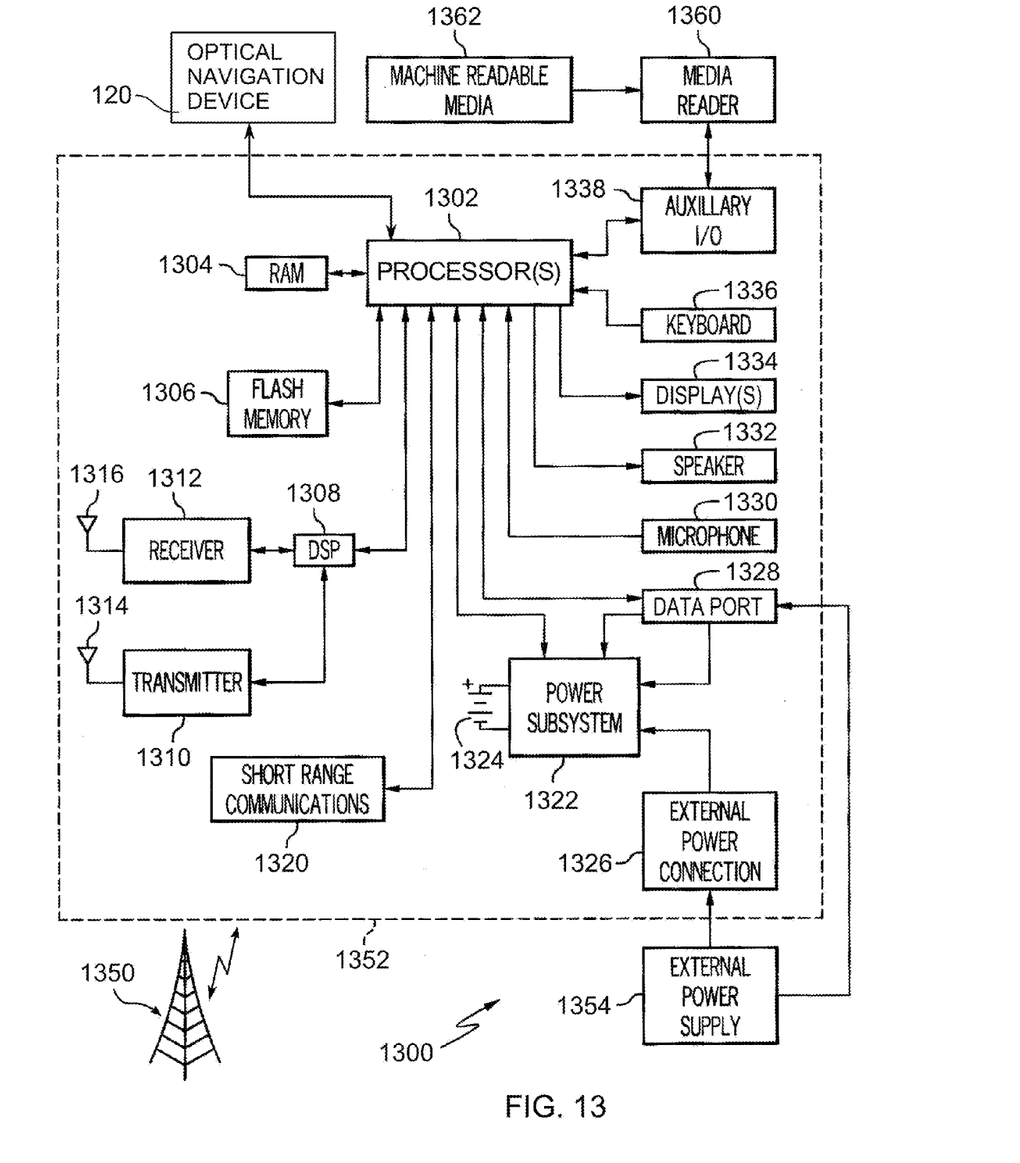
FIG. 13 is a block diagram illustrating a detailed view of an information processing system according to one example.

One or more of optical navigation device 120 may be provided together with, and in electrical and vibratory communication with, any of the components shown in FIG. 13, in FIG. 13, which is a block diagram of an electronic apparatus and associated components 1300. In this example, an electronic apparatus 1352 is a wireless two-way communication device with voice and data communication capabilities. Such electronic apparatus communicate with a wireless voice or data network 1350 using a suitable wireless communications protocol. Wireless voice communications are performed using either an analog or digital wireless communication channel. Data communications allow the electronic apparatus 1352 to communicate with other computer systems via the Internet. Examples of electronic apparatus that are able to incorporate the above described systems and methods include, for example, a data messaging device, a two-way pager, a cellular telephone with data messaging capabilities, a wireless Internet appliance, a tablet computing device or a data communication device that may or may not include telephony capabilities.

The illustrated electronic apparatus 1352 is an example electronic apparatus that includes two-way wireless communications functions. Such electronic apparatus incorporate communication subsystem elements such as a wireless transmitter 1310, a wireless receiver 1312, and associated components such as one or more antenna elements 1314 and 1316. A digital signal processor (DSP) 1308 performs processing to extract data from received wireless signals and to generate signals to be transmitted. The particular design of the communication subsystem is dependent upon the communication network and associated wireless communications protocols with which the device is intended to operate.

The electronic apparatus 1352 includes a microprocessor 1302 that controls the overall operation of the electronic apparatus 1352. The microprocessor 1302 interacts with the above described communications subsystem elements and also interacts with other device subsystems such as flash memory 1306, random access memory (RAM) 1304, auxiliary input/output (I/O) device 1338, data port 1328, display 1334, keyboard 1336, speaker 1332, microphone 1330, a short-range communications subsystem 1320, a power subsystem 1322, and any other device subsystems.

A battery 1324 is connected to a power subsystem 1322 to provide power to the circuits of the electronic apparatus 1352. The power subsystem 1322 includes power distribution circuitry for providing power to the electronic apparatus 1352 and also contains battery charging circuitry to manage recharging the battery 1324. The external power supply 1354 is able to be connected to an external power connection 1326 or through a USB port 1328, as is described in detail above. The power subsystem 1322 includes a battery monitoring circuit that is operable to provide a status of one or more battery status indicators, such as remaining capacity, temperature, voltage, electrical current consumption, and the like, to various components of the electronic apparatus 1352.

The data port 1328 is able to support data communications between the electronic apparatus 1352 and other devices through various modes of data communications, such as high speed data transfers over an optical communications circuits or over electrical data communications circuits such as a Universal Serial BUS ("USB") connection incorporated into the data port 1328 of some examples. Data port 1328 is able to support communications with, for example, an external computer or other device.

Data communication through data port 1328 enables a user to set preferences through the external device or through a software application and extends the capabilities of the device by enabling information or software exchange through direct connections between the electronic apparatus 1352 and external data sources rather then via a wireless data communication network. In addition to data communication, the data port 1328 provides power to the power subsystem 1322 to charge the battery 1324 or to supply power to the electronic circuits, such as microprocessor 1302, of the electronic apparatus 1352.

Operating system software used by the microprocessor 1302 is stored in flash memory 1306. Further examples are able to use a battery backed-up RAM or other non-volatile storage data elements to store operating systems, other executable programs, such as the program to carry out the process examples herein, or both. The operating system software, device application software, or parts thereof, are able to be temporarily loaded into volatile data storage such as RAM 1304. Data received via wireless communication signals or through wired communications are also able to be stored to RAM 1304.

The microprocessor 1302, in addition to its operating system functions, is able to execute software applications on the electronic apparatus 1352. A predetermined set of applications that control basic device operations, including at least data and voice communication applications, is able to be installed on the electronic apparatus 1352 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic apparatus 1352 through, for example, the wireless network 1350, an auxiliary I/O device 1338, Data port 1328, short-range communications subsystem 1320, or any combination of these interfaces. Such applications are then able to be installed by a user in the RAM 1304 or a non-volatile store for execution by the microprocessor 1302.

In a data communication mode, a received signal such as a text message or web page download is processed by the communication subsystem, including wireless receiver 1312 and wireless transmitter 1310, and communicated data is provided the microprocessor 1302, which is able to further process the received data for output to the display 1334, or alternatively, to an auxiliary I/O device 1338 or the Data port 1328. A user of the electronic apparatus 1352 may also compose data items, such as e-mail messages, using the keyboard 1336, which is able to include a complete alphanumeric keyboard or a telephone-type keypad, in conjunction with the display 1334 and possibly an auxiliary I/O device 1338. Such composed items are then able to be transmitted over a communication network through the communication subsystem.

For voice communications, overall operation of the electronic apparatus 1352 is substantially similar, except that received signals are generally provided to a speaker 1332 and signals for transmission are generally produced by a microphone 1330. Alternative voice or audio I/O subsystems, such as a voice message recording subsystem, may also be implemented on the electronic apparatus 1352. Although voice or audio signal output is generally accomplished primarily through the speaker 1332, the display 1334 may also be used to provide an indication of the identity of a calling party, the duration of a voice call, or other voice call related information, for example.

Depending on conditions or statuses of the electronic apparatus 1352, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 1320 provides for data communication between the electronic apparatus 1352 and different systems or devices, which need not necessarily be similar devices. For example, the short-range communications subsystem 1320 includes an infrared device and associated circuits and components or a Radio Frequency based communication module such as one supporting BLUETOOTH® communications, to provide for communication with similarly-enabled systems and devices, including the data file transfer communications described above.

A media reader 1360 is able to be connected to an auxiliary I/O device 1338 to allow, for example, loading computer readable program code of a computer program product into the electronic apparatus 1352 for storage into flash memory 1306. One example of a media reader 1360 is an optical drive such as a CD/DVD drive, which may be used to store data to and read data from a computer readable medium or storage product such as computer readable storage media 1362. Examples of suitable computer readable storage media include optical storage media such as a CD or DVD, magnetic media, or any other suitable data storage device. Media reader 1360 is alternatively able to be connected to the electronic apparatus through the data port 1328 or computer readable program code is alternatively able to be provided to the electronic apparatus 1352 through the wireless network 1350.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

The invention claimed is:

1. A navigation device for use in a computing device having a display for displaying objects and a cursor, the navigation device comprising:

an optical navigation sensor, wherein the optical navigation sensor is an optical joystick or mouse navigation sensor having a planar surface, the optical navigation sensor operative to transmit a data signal pertaining to a change in a reflection of light from movement of an object upon the surface, the light reflected within the optical navigation sensor; and a vibratory transducer positioned beneath the planar surface and configured to produce vibration responsive to the transmitted data signal when the transmitted data signal corresponds to the movement of an object upon surface of the optical joystick or mouse navigation sensor causing the cursor being to be over or near a predetermined visibly displayed object on the display, the transducer positioned to propagate the vibration to the surface of the optical navigation sensor.

2. The navigation device of claim 1, wherein the surface of the optical navigation sensor reflects light responsive to movement of an object in contact with the surface, the optical navigation sensor operative to communicate information pertaining to the light reflected by the optical navigation sensor.

3. The navigation device of claim 1, wherein the vibratory transducer is operative to produce vibration at a plurality of frequencies, for predetermined time periods.

4. The navigation device of claim 1, further comprising at least one pressure sensor operative to detect pressure and electrically communicate information pertaining to sensed pressure, the at least one pressure sensor positioned to detect a pressure upon the surface of the optical navigation sensor.

5. The navigation device of claim 1, further comprising a resilient material connected to the optical navigation sensor, and wherein the resilient material deflects to enable movement of the optical navigation sensor.

6. The navigation device of claim 5, wherein the resilient material is a tactile dome operative for damping movement of the surface of the optical navigation sensor.

7. The navigation device of claim 5, wherein the resilient material includes a pressure sensor operative to detect pressure and electrically communicate information pertaining to sensed pressure, the pressure sensor positioned operative to detect a pressure upon the surface of the optical navigation sensor.

8. The navigation device of claim 1, further comprising one or more locators operative to contain the vibratory transducer within an area while permitting a desired movement and vibration of the vibratory transducer.

9. The navigation device of claim 8, further comprising an extending surface connected to the one or more locators and operative to bias the vibratory transducer in a direction of the surface of the optical navigation sensor.

10. The navigation device of claim 1, further comprising a base operative to contact the optical navigation sensor, the base including a projection extending toward the vibratory transducer.

11. The navigation device of claim 1, further comprising a housing, the housing defining a slot sized to admit passage of the vibratory transducer.

12. The navigation device of claim 1, further comprising a housing operative to contain the vibratory transducer, the housing including a mounting locator operative to orient the housing and contain vibratory transducer with respect to a location within an apparatus containing the housing.

13. The navigation device of claim 1, wherein an apparatus containing the navigation device has an outer housing, and wherein the vibration is transmitted to the surface of the optical navigation sensor to a substantially greater extent than to the apparatus housing.

14. The navigation device of claim 1, wherein the vibration is audible.

15. The navigation device of claim 1, wherein the vibration varies over time.

16. The navigation device of claim 1, further comprising a housing operative to contact the optical navigation sensor, the housing defining a chamber operative to admit the vibratory transducer and sized larger than the vibratory transducer, whereby the vibratory transducer is free to vibrate within the housing and is retained within the housing when vibrating.

17. The navigation device of claim 16, wherein the housing further includes a projecting surface extending in a direction of a vibratory transducer housed by the housing, the projecting surface operative to bias the vibratory transducer in a direction away from the surface.

18. An apparatus, comprising:
a controller;
a display configured to display a visible region and a cursor in response to the controller; and
a navigation device communicatively coupled to the controller, the navigation device including:
an optical navigation sensor, wherein the optical navigation sensor is an optical joystick or mouse navigation sensor having a planar surface, the optical navigation sensor communicatively coupled to the controller and operative to sense movement of an object in contact with the surface due to light reflected from the object, the light reflected within the optical navigation sensor; and
a vibratory transducer positioned beneath the surface to propagate vibration to the surface, the transducer configured to produce vibration at a plurality of frequencies, for predetermined time periods, responsive to an electrical signal from the controller, wherein the cursor caused to move by the controller in response to an object moved in contact with the surface of the optical joystick or mouse navigation sensor and the vibration relating to the movement of the cursor related to a predetermined visible displayed region.

19. The apparatus of claim 18, further comprising a pressure sensor operative to detect pressure and electrically communicate information pertaining to sensed pressure to the controller, the pressure sensor positioned to detect a pressure upon the surface of the optical navigation sensor.

20. A method of indicating a sensed gesture, comprising:
sensing a movement with an optical navigation sensor, wherein the optical navigation sensor is an optical joystick or mouse navigation sensor having a planar surface, the sensor configured to detect light reflected from an object moved upon the surface, the light reflected within the optical navigation sensor;
comparing, using a processor, a location of a cursor indicator with a location of a displayed object, the displayed object enabled for vibration by the processor when the cursor indicator is moved near or over the displayed object by movement of an object upon the surface of the optical joystick or mouse navigation sensor; and
activating a vibratory transducer operative to produce vibration for predetermined time periods, the transducer positioned to propagate the vibration to the surface of the optical navigation sensor when the indicator is near or over the displayed object and the gesture is sensed.

\* \* \* \* \*